(12) United States Patent
Van Dine

(10) Patent No.: US 7,449,260 B2
(45) Date of Patent: Nov. 11, 2008

(54) FUEL CELL STACK INCLUDING HYDROGEN PUMPING FUEL CELLS

(75) Inventor: Leslie L. Van Dine, Manchester, CT (US)

(73) Assignee: UTC Power Corporation, South Windsor, CT (US)

( * ) Notice: Subject to any disclaimer, the term of this patent is extended or adjusted under 35 U.S.C. 154(b) by 406 days.

(21) Appl. No.: 10/744,880

(22) Filed: Dec. 23, 2003

(65) Prior Publication Data

US 2005/0136313 A1 Jun. 23, 2005

(51) Int. Cl.
*H01M 8/04* (2006.01)
*H01M 8/24* (2006.01)
(52) U.S. Cl. .................. 429/32; 429/34; 429/38
(58) Field of Classification Search .................. None
See application file for complete search history.

(56) References Cited

U.S. PATENT DOCUMENTS 6,280,865 B1 * 8/2001 Eisman et al. ................ 429/17
6,399,231 B1 6/2002 Donahue et al.
2006/0029851 A1 * 2/2006 Santiago et al. ............. 429/30

FOREIGN PATENT DOCUMENTS

JP 08321316 A * 12/1996

OTHER PUBLICATIONS

Fuel Cell Hardware, Electrochem Inc., http://www.fuelcell.com/index.asp?PageAction=VIEWCATS&Category=19.*

* cited by examiner

*Primary Examiner*—Jonathan Crepeau
*Assistant Examiner*—Robert Hodge
(74) *Attorney, Agent, or Firm*—Bachman & LaPointe, P.C.

(57) ABSTRACT

A fuel cell system includes a fuel cell stack having a first plurality of fuel cells each having an anode, a cathode and an electrolyte disposed therebetween, the first plurality of fuel cells being communicated with a source of hydrogen-containing fuel and oxidant so as to generate an electric current, an oxidant exhaust stream and a hydrogen-containing exhaust stream; the stack further having a second plurality of fuel cells each having an anode, a counter electrode and an electrolyte disposed therebetween, the second plurality of fuel cells being communicated with the electric current and the hydrogen-containing exhaust stream so as to produce a hydrogen rich stream, the first plurality of fuel cells being communicated with the second plurality of fuel cells to receive the hydrogen rich stream as at least a portion of the source of hydrogen-containing fuel.

6 Claims, 2 Drawing Sheets

FUEL CELL STACK INCLUDING HYDROGEN PUMPING FUEL CELLS

BACKGROUND OF THE INVENTION

The invention relates to fuel cell systems and, more particularly, to a system and method for enhancement of hydrogen recycle in connection with same.

An objective in operation of fuel cell systems is to achieve a high overall external hydrogen utilization while keeping internal hydrogen utilization, within the anode, at a low level. Typically, this requires hydrogen recycle blowers, or internal cascading of the hydrogen flow. Cascading complicates the cell stack design and makes purging of the system difficult, resulting in the potential for increased cell stack decay.

Hydrogen recycle pumps are noisy, require control systems, use parasite power and have reliability issues.

It is the primary object of the present invention to provide an improved system and method for addressing the above-identified problems.

It is a further object of the present invention to provide a system and method for operating same wherein hydrogen utilization is maintained constant despite different currents in the fuel cell stack.

Other objects and advantages of the present invention will appear hereinbelow.

SUMMARY OF THE INVENTION

In accordance with the present invention, the foregoing objects and advantages have been readily attained.

According to the invention, a fuel cell system is provided, which comprises a fuel cell stack comprising a first plurality of fuel cells each having an anode, a cathode and an electrolyte disposed therebetween, said first plurality of fuel cells being communicated with a source of hydrogen-containing fuel and oxidant so as to generate an electric current, an oxidant exhaust stream and a hydrogen-containing exhaust stream; said stack further comprising a second plurality of fuel cells each having an anode, a counter electrode and an electrolyte disposed therebetween, said second plurality of fuel cells being communicated with said electric current and said hydrogen-containing exhaust stream so as to produce a hydrogen rich stream, at said counter electrode said first plurality of fuel cells being communicated with said second plurality of fuel cells to receive said hydrogen rich stream as at least a portion of said source of hydrogen-containing fuel.

In further accordance with the present invention, a method is provided for operating a fuel cell system which comprises a stack of fuel cells comprising a first plurality each having an anode, a cathode and an electrolyte positioned therebetween and a second plurality each having an anode, a counter electrode and an electrolyte disposed therebetween, which method comprises the steps of feeding a hydrogen-containing fuel to anode inlets of said first plurality of said fuel cells; feeding an oxidant to cathode inlets of said first plurality of said fuel cells so as to generate an electric current through said stack and a hydrogen-containing exhaust; feeding said hydrogen-containing exhaust to anode inlets of a second plurality of said fuel cells, said second plurality being communicated with said electric current so as to generate a hydrogen rich stream from said counter electrodes of said second plurality; and feeding said hydrogen rich stream to said anode inlets of said first plurality of fuel cells.

BRIEF DESCRIPTION OF THE DRAWING

A detailed description of preferred embodiments of the present invention follows, with reference to the attached drawings, wherein.

DETAILED DESCRIPTION

The invention relates to a fuel cell system and method and, more particularly, to a system and method which utilize fuel cells within the fuel cell stack as hydrogen pump cells for separating and recycling hydrogen from the anode exhaust back to the stack anode fuel inlet, thereby providing desirably high external hydrogen utilization while minimizing internal hydrogen utilization, and further providing for recycle of a highly pure hydrogen stream from the anode exhaust back to the anode inlet.

Figure 1:
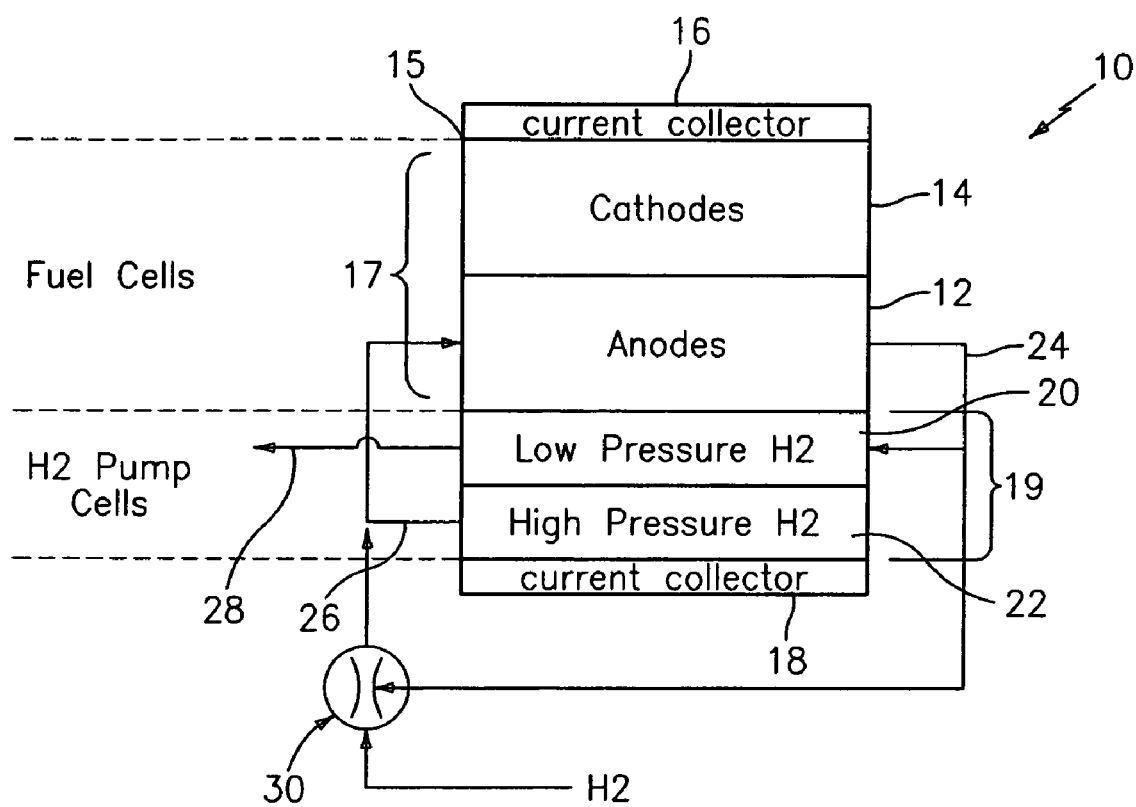
FIG. 1 schematically illustrates a system and method in accordance with the present invention.

FIG. 1 shows a system 10 schematically illustrating a plurality of anodes 12 and cathodes 14 in a stack 15 between endplate/current collectors 16, 18.

As is well known to a person of ordinary skill in the art, a hydrogen-containing fuel is fed to anodes 12, while an oxidant is fed to cathodes 14, the result being generation of an electric current, a cathode exhaust, and an anode exhaust which still contains hydrogen.

In accordance with the present invention, in addition to the first plurality 17 of fuel cells schematically illustrated by anodes 12 and cathodes 14, an additional fuel cell or fuel cells 19 are incorporated into the stack and operated as hydrogen pump cells. These cells are schematically illustrated by anode 20 and counter electrode 22 in FIG. 1.

As is known to a person of ordinary skill in the art, by providing a current across hydrogen pump cells, hydrogen can be electrochemically transferred from lower to higher pressure across the standard fuel cell.

In accordance with the present invention, anode 20 and counter electrode 22 are positioned to be driven by current generated by the stack, or cell current, which results in a relatively low pump cell voltage drop while nevertheless effectively pumping hydrogen as desired. As discussed below, a supplemental external power supply can be provided as well.

In accordance with the invention, anode exhaust is fed through a manifold or other suitable flow conduit 24 to an anode inlet of anode 20 of the hydrogen pump cells. Under cell current, hydrogen at a very high level of purity is transferred across the electrolyte to counter electrode 22 to produce a high purity hydrogen exhaust stream in conduit 26 which is suitable for feed back to anodes 12 of the first plurality of fuel cells of the system 10. In addition, anode exhaust from the hydrogen pump cells, as illustrated in conduit 28, now contains substantially no hydrogen, with constituents consisting of various components which can be treated as exhaust.

The cell potential required to pump hydrogen at nearly zero head rise has been demonstrated in certain types of cell stacks, such as that schematically illustrated in FIG. 1. In such fuel cell stacks, a very small potential can generate very high currents, and equivalent hydrogen flow, across the electrolyte. The cell potential in such a configuration is related to the current density, and in a typical configuration is about 7 mv/100 ma/cm², or about 7.54 mv/100 asf. Thus, 70 mv can pump 1000 ma/cm² of hydrogen across a cell.

It should further be appreciated that the hydrogen pump cell can achieve a substantial head rise. The potential required to generate a 10:1 head rise across a typical electrolyte is only 33.6 mv. The required cell potential for pressuration at 65° C. can be determined as follows:

cell potential $(inmv) = \{33.6 * \log 10(Phigh/Plow)\}$, wherein (Phigh/Plow) is the rate of hydrogen partial pressure from the inlet side of the hydrogen pump cell to the exhaust side.

Based upon the foregoing, a total cell driving potential of 103.4 mv can pump a 1000 ma/cm² hydrogen flow up a factor of 10 in pressure. In a more typical case, 23 mv can be used to increase 200 ma/cm² of hydrogen more than 2.5 psia in pressure.

These principles, incorporated into the stack of the present invention, provide for an excellent recycle of hydrogen as desired.

As set forth above, the hydrogen pump cells derive their driving current from the stack current flow as it passes through the pump cells to the current collector 18. This current automatically recycles hydrogen fed from the anode exhaust through the anode inlet of the hydrogen pump cells at a fixed ratio to the overall fuel flow, thus maintaining a constant internal hydrogen utilization at any power level. This constant internal hydrogen utilization is a function of the relative number of fuel cells and pump cells.

It should of course be appreciated that the system in accordance with FIG. 1 includes oxidant fed to cathodes 14 of the fuel cells of system 10, and operation of the system generates an exhaust stream from cathodes 14, the disposition of which is well within the skill of a person of ordinary skill in the art.

It should further be appreciated that the use of hydrogen pump cells in accordance with the present invention advantageously recycles only water saturated pure hydrogen to anodes 12 of the fuel cells of the stack, while most of the nitrogen or other diluents in the anode exhaust of the fuel cells is exhausted through the pump cells as well. A small amount of nitrogen may diffuse into the recycling hydrogen stream 26 in the hydrogen pump cells, but only in insignificant amounts.

This water saturated hydrogen advantageously further saturates incoming dry hydrogen from the main fuel source to the anodes, which is also a desirable function.

In accordance with the present invention, the various operating parameters can be adjusted by adjusting the number of hydrogen pump cells relative to the number of fuel cells. For example approximately 16-24% of the cells being operated as hydrogen pump cells can readily achieve 85-90% internal hydrogen utilization along with a 99% external hydrogen utilization.

Still referring to FIG. 1, in accordance with a further aspect of the present invention, a recycle pump 30 such as a supplemental recycle ejector or blower can be provided if desired for receiving and recycling a portion of the exhaust stream from anodes 12. An ejector is a simple pump with no moving parts which uses the energy of a higher pressure inlet hydrogen to raise the pressure of the lower pressure hydrogen recycle stream. Provision of this ejector can advantageously reduce the number of pump cells required to achieve a given internal hydrogen utilization while maintain a relatively simple and non-motorized hydrogen recycle approach.

In such a system, the main hydrogen feed acts as driver hydrogen to enhance recycle flow through the ejector as illustrated. Of course, a simple blower can be provided if desired, for providing the same function of assisting in recycle flow from anode exhaust 24 to the anode inlet.

It should be appreciated that, in accordance with the present invention, a fuel cell system 10 has been provided which includes a first plurality of fuel cells operated conventionally to generate current, and a second plurality of fuel cells, within the same stack, operated as hydrogen pump cells for receiving exhaust from the anode exhausts of the first plurality of fuel cells, wherein the second plurality of cells are driven by current through the stacks so as to operate as hydrogen pumps, thereby pumping hydrogen from the anode exhaust stream across the electrolyte in the hydrogen pump cells to be exhausted from the counter electrode side as a water saturated substantially pure hydrogen stream which can be fed back to the anode of the first plurality of fuel cells to be further utilized as fuel. This operation is carried out with the counter electrode inlets of the hydrogen pump cells substantially blocked, and the anode exhaust from the hydrogen pump cells contains various components disposed of as exhaust.

Positioning the hydrogen pump cells within the stack advantageously serves to allow these pump cells to be driven by current generated within a stack, thereby maintaining a constant percentage recycle rate of hydrogen which results in constant utilizations at any operating current.

Figure 2:
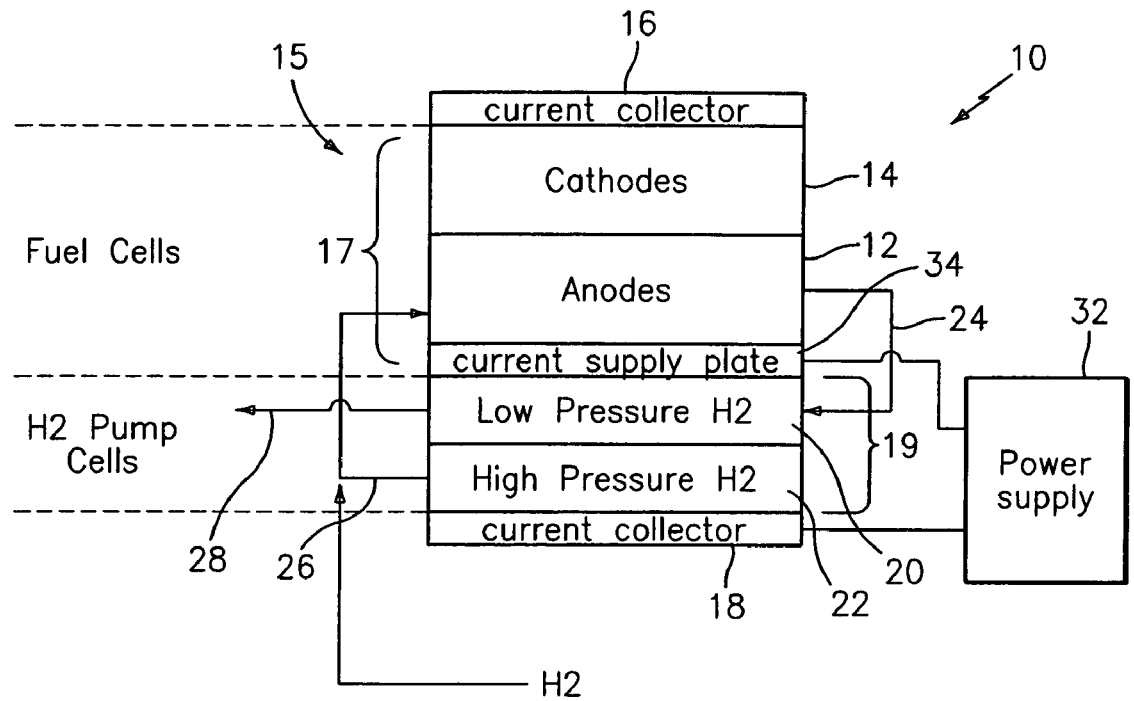
FIG. 2 schematically illustrates an alternative embodiment of the present invention using an additional external power supply.

Turning now to FIG. 2, a further alternative embodiment of the present invention is illustrated wherein an external power supply is provided for supplementing the stack current flow through the pump cells so as to increase the amount of hydrogen recycle without increasing the number of pump cells in the stack.

FIG. 2 shows a system 10 having fuel cells 17 and hydrogen pump cells 19 in similar fashion to FIG. 1. Fuel cells 17 include anodes 12 and cathodes 14, and hydrogen pump cells 19 include an anode 20 and counter electrode 22 as well. In this embodiment, however, an additional external power supply 32 is provided for applying, preferably selectively applying, an additional current across the hydrogen pump cells. In this embodiment, a current supply plate 34 is advantageously positioned between fuel cells 17 and hydrogen pumps cells 19, and power supply 32 is connected between current supply plate 34 and pump cell end plate 18 as shown in FIG. 2. External supplemental power supply 32 can advantageously greatly improve the hydrogen recycle capacity of a system in accordance with the present invention. For example, using a system having a stack current of 30 amps across the hydrogen pump cell, applying additional 30 amp external power supply substantially doubles the hydrogen recycle flow.

In accordance with a further aspect of the present invention, external power supply 32 can be applied continuously, or can be applied only when additional recycle is required, for example at lower current densities or during power transients, which conditions can be detected by suitable sensors and conveyed to a suitable control mechanism for appropriately controlling external power supply 32 as desired. Operative associations of the control function of power supply 32 with system 10 to provide this functioning is well within the skill of a person of ordinary skill in the art.

Figure 3:
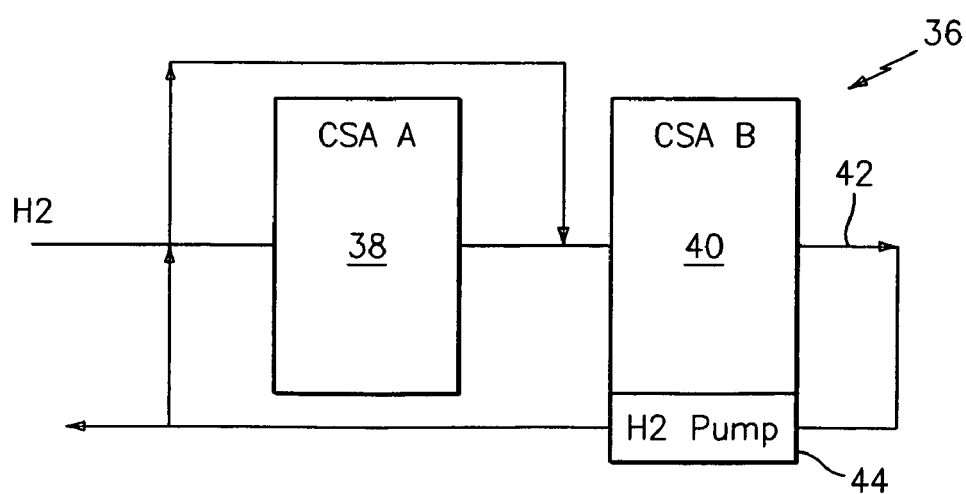
FIG. 3 schematically illustrates a further embodiment of the present invention.

Turning now to FIG. 3, a further embodiment of the present invention is shown wherein a system 36 includes a first cell stack assembly 38 and a second cell stack assembly 40. Cell stack assemblies 38, 40 are adapted to treat hydrogen flow either in parallel, or in series, or both, and anode exhaust from fuel cells of second cell stack assembly 40, shown by arrow 42, is fed to the hydrogen pump cells 44 for recycling hydrogen from collected exhaust from both cell stack assemblies 38, 40.

In this type of system, for example in a pump device consisting of eight hydrogen pump cells added to the two cell configuration shown in FIG. 3, where each cell stack assembly 38, 40 is a 220 cell stack assembly, sufficient recycle can be provided to maintain 96% to 98% overall hydrogen utilization from rated power to idle. The pump cells would have less than about 2% of the total stack active area and would require a 500 watt power supply. Internal utilization of each cell stack assembly would range from 27% at idle to 91% at rated power. This is entirely consistent with the requirements of stable cell stack assembly operation across these power levels.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A fuel cell system, comprising:
a fuel cell stack comprising a first plurality of fuel cells each having an anode, a cathode and an electrolyte disposed therebetween, said first plurality of fuel cells being communicated with a source of hydrogen-containing fuel and oxidant so as to generate an electric current, an oxidant exhaust stream and a hydrogen-containing exhaust stream;
said stack further comprising a second plurality of fuel cells each having an anode, a counter electrode and an electrolyte disposed therebetween, wherein said first plurality and said second plurality are arranged in said stack having two ends, and further comprising two current collectors positioned at said ends, whereby current generated by said first plurality of fuel cells passes through said second plurality of fuel cells, said second plurality of fuel cells being communicated with said hydrogen-containing exhaust stream whereby said current in said second plurality of fuel cells produces a hydrogen rich stream at said counter electrode, said first plurality of fuel cells being communicated with said second plurality of fuel cells to receive said hydrogen rich stream as at least a portion of said source of hydrogen-containing fuel, wherein said first plurality of fuel cells extends uninterrupted from one of said two current collectors at one of said two ends to said second plurality of fuel cells, and wherein said second plurality of fuel cells extends uninterrupted from said first plurality of fuel cells to the other of said current collectors at the other of said two ends.

2. The system of claim 1, wherein said first plurality of fuel cells have anode inlets communicated with said source of hydrogen-containing fuel, cathode inlets communicated with said source of oxidant, anode outlets and cathode outlets, and wherein said second plurality of fuel cells have anode inlets communicated with said anode outlets of said first plurality of fuel cells, anode outlets communicated with system exhaust, and counter electrode outlets communicated with said anode inlets of said first plurality of fuel cells.

3. The system of claim 1, further comprising a recycle pump communicated between exhaust from said anodes of said first plurality of fuel cells and an inlet to said anodes.

4. The system of claim 3, wherein said recycle pump is a recycle ejector having an inlet communicated with a source of hydrogen to said fuel cell system, and having a recycle inlet communicated with said exhaust from said anodes, and having an outlet communicated with inlets to said anodes of said first plurality of fuel cells.

5. The system of claim 1, wherein said first plurality of fuel cells extends from a first current collector of said two current collectors at one end of the stack to the second plurality of fuel cells, and wherein said second plurality of fuel cells extends from said first plurality of fuel cells to a second current collector of said two current collectors at the other end of the stack.

6. The system of claim 5, wherein said first plurality of fuel cells and said second plurality of fuel cells are arranged in said stack so that current from all of said first plurality of fuel cells passes through said second plurality of fuel cells.

* * * * *